(12) United States Patent
Weerasooriya et al.

(10) Patent No.: US 7,468,855 B1
(45) Date of Patent: Dec. 23, 2008

(54) SERVO WRITING A DISK DRIVE FROM A NUMBER OF SPIRAL TRACKS EQUAL TO A NON-INTEGER MULTIPLE OF PRODUCT SERVO WEDGES

(75) Inventors: Siri S. Weerasooriya, Campbell, CA (US); Tehri S. Lee, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 28 days.

(21) Appl. No.: 11/704,430

(22) Filed: Feb. 9, 2007

(51) Int. Cl.
*G11B 21/02* (2006.01)
*G11B 5/09* (2006.01)
*G11B 5/596* (2006.01)

(52) U.S. Cl. .................. 360/75; 360/51; 360/77.07
(58) Field of Classification Search ............ None
See application file for complete search history.

(56) References Cited

U.S. PATENT DOCUMENTS

| | | | |
|---|---|---|---|
| 5,594,924 A | 1/1997 | Ottesen et al. | |
| 5,619,387 A | 4/1997 | Ottesen et al. | |
| 5,630,104 A | 5/1997 | Ottesen et al. | |
| 5,668,679 A | 9/1997 | Swearingen et al. | |
| 6,304,407 B1 | 10/2001 | Baker et al. | |
| 6,687,073 B1 | 2/2004 | Kupferman | |
| 6,704,156 B1 | 3/2004 | Baker et al. | |
| 6,943,978 B1 | 9/2005 | Lee | |
| 6,965,489 B1 | 11/2005 | Lee et al. | |
| 6,967,799 B1 | 11/2005 | Lee | |
| 6,977,789 B1 | 12/2005 | Cloke | |
| 6,977,792 B1 | 12/2005 | Melrose et al. | |
| 6,985,316 B1 | 1/2006 | Liikanen et al. | |
| 6,987,636 B1 | 1/2006 | Chue et al. | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 7,016,134 B1 | 3/2006 | Agarwal et al. | |
| 7,054,083 B2 | 5/2006 | Ehrlich | |
| 7,068,459 B1 | 6/2006 | Cloke et al. | |
| 7,088,533 B1 | 8/2006 | Shepherd et al. | |
| 7,307,807 B1 * | 12/2007 | Han et al. | 360/75 |
| 2006/0007588 A1 | 1/2006 | Oki | |
| 2006/0103967 A1 | 5/2006 | Kim et al. | |

OTHER PUBLICATIONS

US 6,906,885, 06/2005, Agarwal et al. (withdrawn)

* cited by examiner

*Primary Examiner*—Andrew L. Sniezek
(74) *Attorney, Agent, or Firm*—Howard H. Sheerin, Esq.

(57) ABSTRACT

A method is disclosed of writing product servo sectors to a disk of a disk drive to define a plurality of product servo wedges, the disk comprising a plurality of spiral tracks. The spiral tracks are spaced apart circumferentially by a substantially equal spacing, and the number of spiral tracks equals a non-integer multiple of product servo wedges. The head internal to the disk drive is used to read the spiral tracks to generate a read signal, and the sync marks are detected from the read signal to generate a sync mark detect signal. A timing recovery measurement is generated in response to the sync mark detect signal, and a frequency control signal is generated in response to the timing recovery measurement. A servo write clock is generated in response to the frequency control signal which is used to write the product servo sectors to the disk.

22 Claims, 12 Drawing Sheets

SERVO WRITING A DISK DRIVE FROM A NUMBER OF SPIRAL TRACKS EQUAL TO A NON-INTEGER MULTIPLE OF PRODUCT SERVO WEDGES

BACKGROUND

1. Field

The present invention relates to disk drives for computer systems. More particularly, the present invention relates to servo writing a disk drive from a number of spiral tracks equal to a non-integer multiple of product servo wedges.

2. Description of the Related Art

Figure 1:
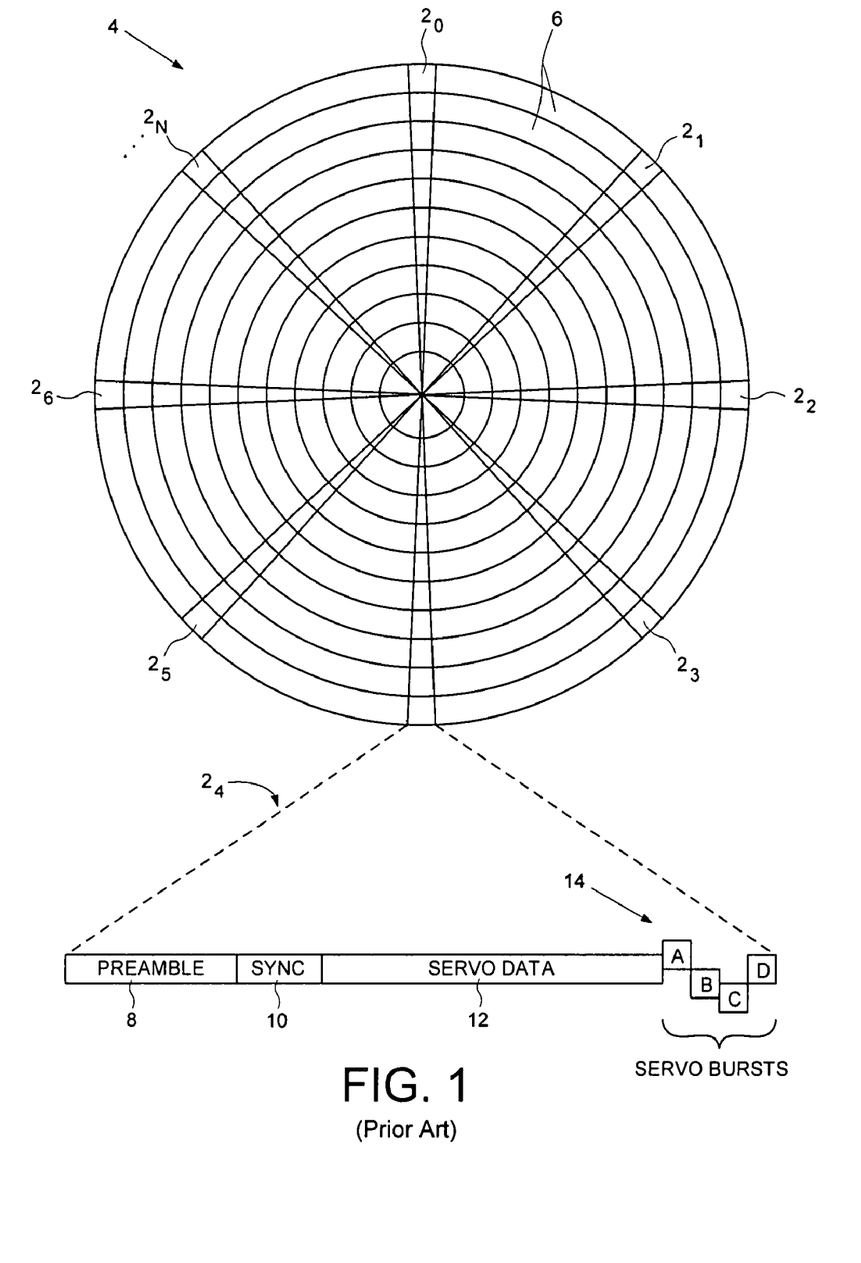
FIG. 1 shows a prior art disk format including a plurality of servo tracks defined by sectors that form servo wedges.

When manufacturing a disk drive, product servo sectors $2_0$-$2_N$ are written to a disk 4 which define a plurality of radially-spaced, concentric servo tracks 6 as shown in the prior art disk format of FIG. 1. The product servo sectors are said to form servo wedges or servo spokes from the outer to inner diameter of the disk. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks, wherein the servo write clock is used to write the product servo sectors at the appropriate circular location as well as at the appropriate frequency. However, the '679 patent does not address the effect on the servo write clock when the product servo sectors overwrite the spiral tracks.

Therefore, when writing product servo sectors onto a disk of a disk drive by synchronizing a servo write clock to spiral tracks, there is a need to ameliorate the effect on the servo write clock when the product servo sectors overwrite the spiral tracks.

SUMMARY OF THE INVENTION

An embodiment of the present invention comprises a disk drive including a disk having a plurality of spiral tracks. Each spiral track comprises a high frequency signal interrupted periodically by a sync mark, the spiral tracks are spaced apart circumferentially by a substantially equal spacing, and the number of spiral tracks equals a non-integer multiple of product servo wedges. The disk drive further comprises an actuator arm, a head coupled to a distal end of the actuator arm, and a voice coil motor for rotating the actuator arm about a pivot to position the head radially over the disk. The disk drive writes product servo sectors to the disk to define the product servo wedges. The head internal to the disk drive is used to read the spiral tracks to generate a read signal, and the sync marks are detected from the read signal to generate a sync mark detect signal. A timing recovery measurement is generated in response to the sync mark detect signal, and a frequency control signal is generated in response to the timing recovery measurement. A servo write clock is generated in response to the frequency control signal which is used to write the product servo sectors to the disk.

In one embodiment, the high frequency signal in the spiral tracks is processed to generate a fine timing recovery measurement, wherein the frequency control signal is generated in response to the fine timing recovery measurement.

In another embodiment, a sample interval Ts is associated with the high frequency signal, and the spiral tracks are spaced apart circumferentially by N·Ts, where N is an integer. In one embodiment, the product servo wedges are spaced apart circumferentially by M·Ts, where M is an integer. In one embodiment N<M, and in another embodiment N>M.

In still another embodiment, the spiral tracks are spaced apart by an interval that ensures the control circuitry does not overwrite any part of at least two consecutive spiral tracks with the product servo sectors.

In yet another embodiment, a circumference of the disk comprises R·Ts sample intervals, R·Ts/N=SN, where SN is an integer representing a total number of spiral tracks, and R·Ts/M=PN, where PN is an integer representing a total number of product servo wedges. In one embodiment, N is selected so that the spiral tracks are spaced apart by an interval that ensures the control circuitry does not overwrite any part of at least two consecutive spiral tracks with product servo sectors. In one embodiment, N is the largest integer less than M that ensures the control circuitry does not overwrite any part of at least two consecutive spiral tracks with the product servo sectors. In an alternative embodiment, N is the smallest integer greater than M that ensures the control circuitry does not overwrite any part of at least two consecutive spiral tracks with the product servo sectors.

Another embodiment of the present invention comprises a method of writing product servo sectors to a disk of a disk drive to define a plurality of product servo wedges, the disk comprising a plurality of spiral tracks. Each spiral track comprises a high frequency signal interrupted periodically by a sync mark, the spiral tracks are spaced apart circumferentially by a substantially equal spacing, and the number of spiral tracks equals a non-integer multiple of product servo wedges. The disk drive further comprises an actuator arm, and a head coupled to a distal end of the actuator arm. The head internal to the disk drive is used to read the spiral tracks to generate a read signal, and the sync marks are detected from the read signal to generate a sync mark detect signal. A timing recovery measurement is generated in response to the sync mark detect signal, and a frequency control signal is generated in response to the timing recovery measurement. A servo write clock is generated in response to the frequency control signal which is used to write the product servo sectors to the disk.

DETAILED DESCRIPTION OF EMBODIMENTS OF THE INVENTION

Figure 2A:
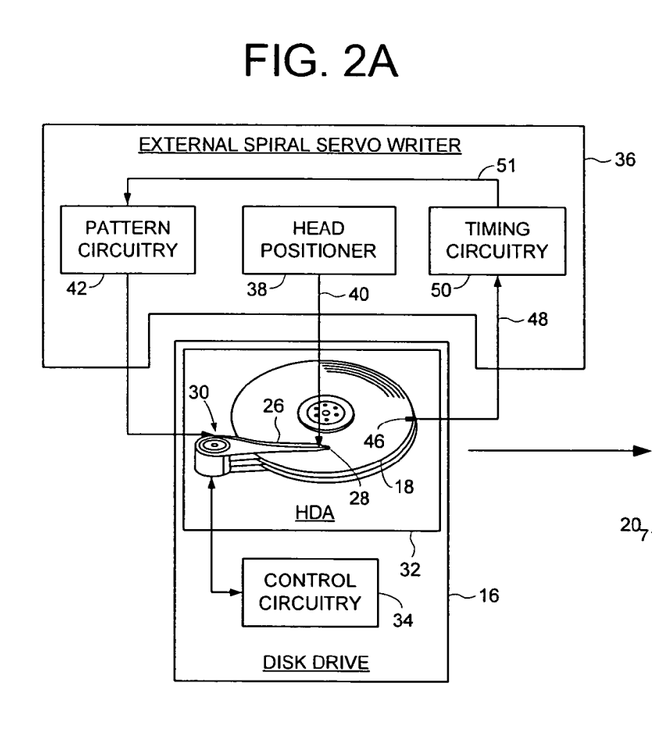
FIGS. 2A and 2B show an embodiment of the present invention wherein a plurality of equally spaced spiral tracks are written to the disk equal to a non-integer multiple of the servo wedges.
Figure 2B:
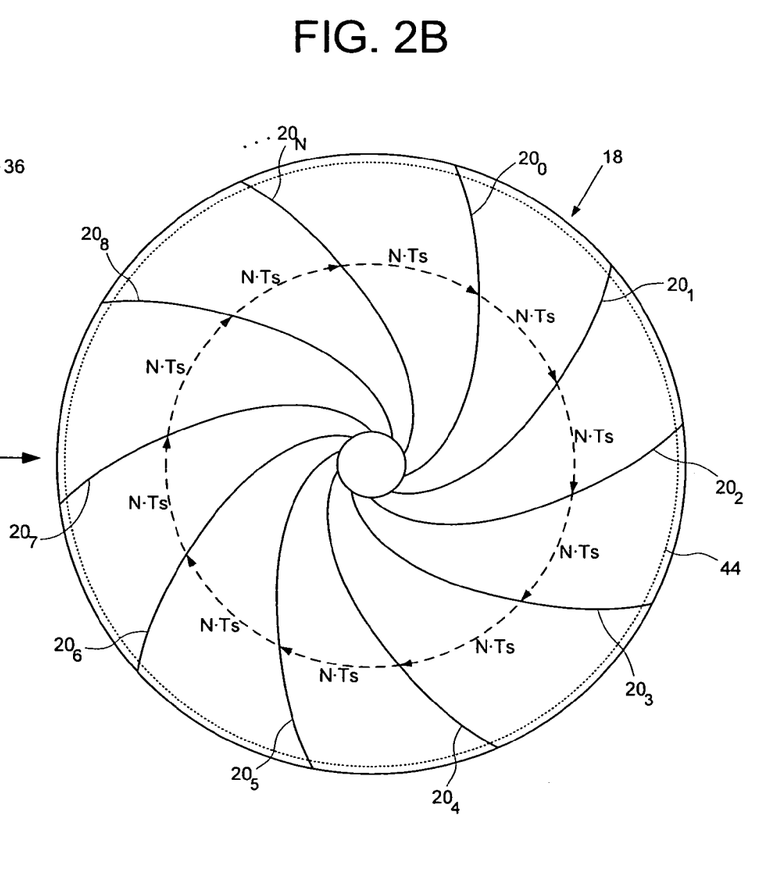

FIGS. 2A and 2B illustrate an embodiment of the present invention as a disk drive 16 including a disk 18 having a plurality of spiral tracks $20_0$-$20_N$. Each spiral track $20_i$ comprises a high frequency signal 22 interrupted periodically by a sync mark 24 (FIG. 4B), the spiral tracks $20_0$-$20_N$ are spaced apart circumferentially by a substantially equal spacing, and the number of spiral tracks equals a non-integer multiple of product servo wedges $56_0$-$56_N$ (FIG. 5A). The disk drive 16 further comprises an actuator arm 26, a head 28 coupled to a distal end of the actuator arm 26, and a voice coil motor 30 for rotating the actuator arm 26 about a pivot to position the head 28 radially over the disk 18. The disk drive 16 writes product servo sectors to the disk 18 to define the product servo wedges $56_0$-$56_N$. The head 28 internal to the disk drive 16 is used to read the spiral tracks $20_0$-$20_N$ to generate a read signal, and the sync marks 24 are detected from the read signal to generate a sync mark detect signal. A timing recovery measurement is generated in response to the sync mark detect signal, and a frequency control signal is generated in response to the timing recovery measurement. A servo write clock is generated in response to the frequency control signal which is used to write the product servo sectors to the disk 18.

The external spiral servo writer 36 comprises a head positioner 38 for actuating a head positioning pin 40 using sensitive positioning circuitry, such as a laser interferometer. While the head positioner 38 moves the head 28 at a predetermined velocity over the stroke of the actuator arm 26, pattern circuitry 42 generates the data sequence written to the disk 18 for a spiral track 20. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5A, the constant interval between sync marks 24 (independent of the radial location of the head 28) enables the servo write clock to maintain synchronization while writing the product servo sectors to the disk.

Figure 3:
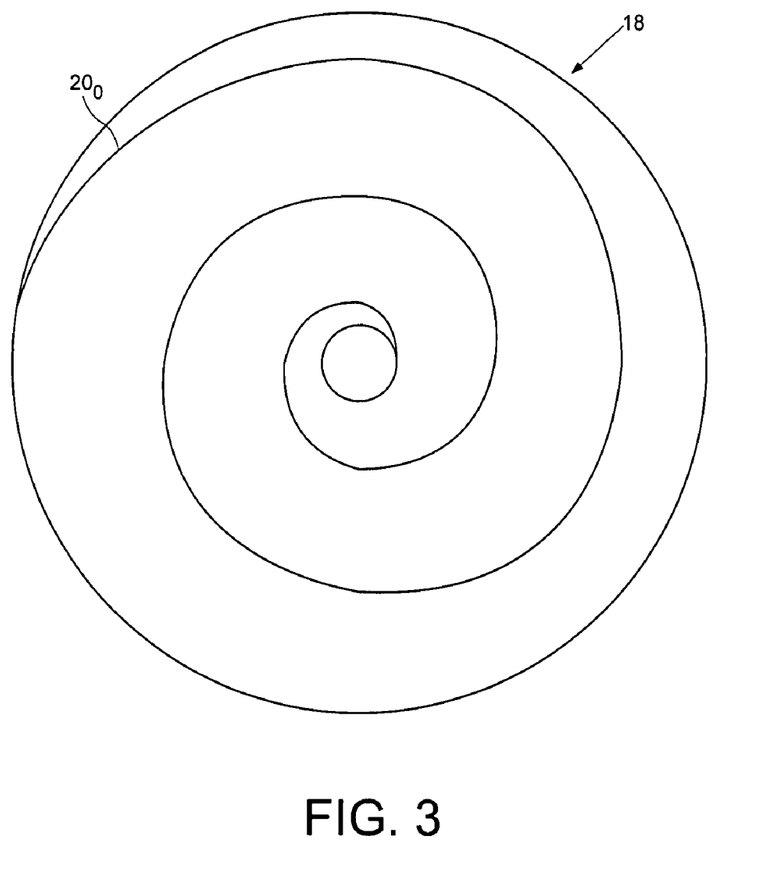
FIG. 3 shows an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18 during a "fill operation". In one embodiment, the control circuitry 34 within the disk drive 16 is used to process the spiral tracks $20_0$-$20_N$ in order to write the product servo sectors to the disk 18. In an alternative embodiment described below with reference to FIGS. 9 and 10, an external product servo writer is used to process the spiral tracks $20_0$-$20_N$ in order to write the product servo sectors to the disk 18.

Figure 4A:
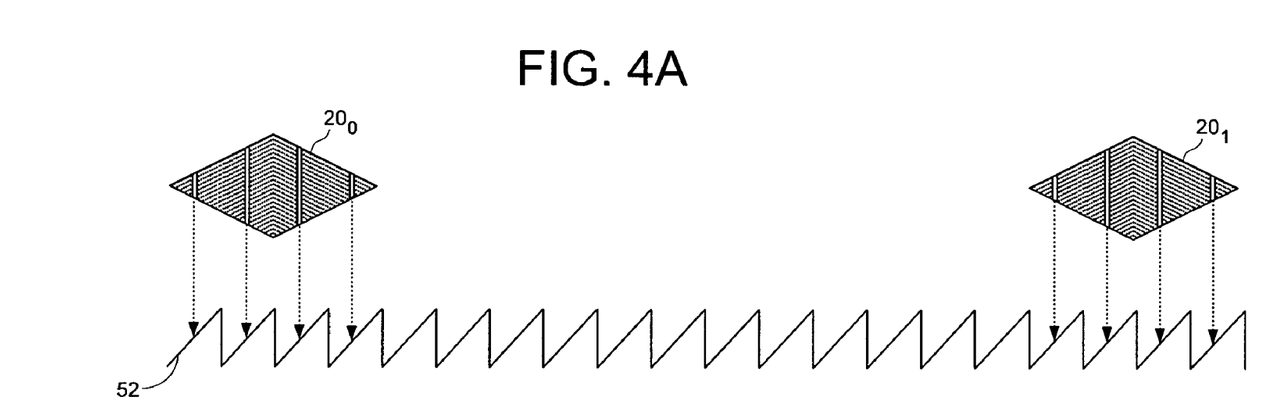
FIG. 4A shows an embodiment of the present invention wherein a servo write clock is synchronized by clocking a modulo-N counter relative to when the sync marks in the spiral tracks are detected.
Figure 4B:
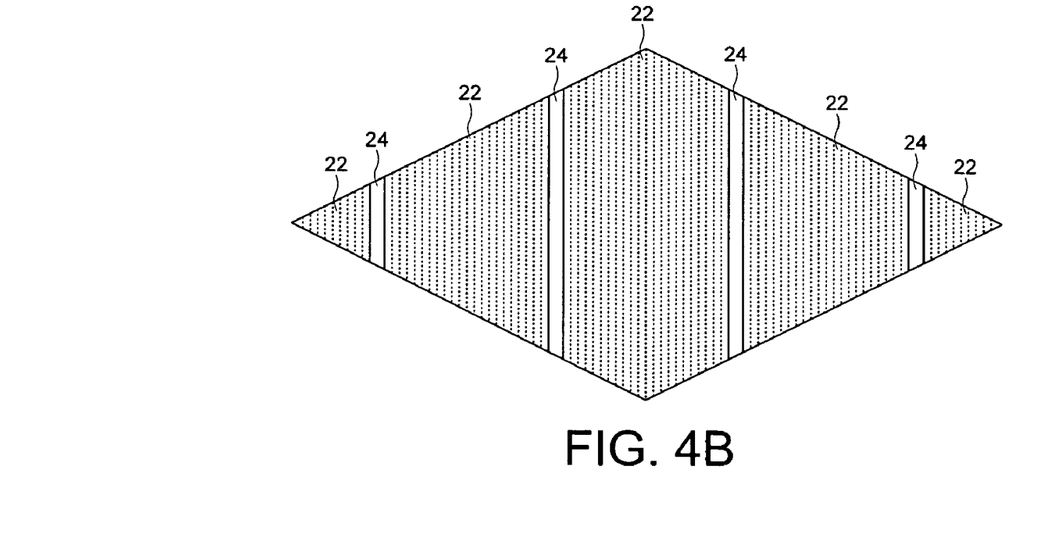
FIG. 4B shows an eye pattern generated by reading the spiral track, including the sync marks in the spiral track.
Figure 5A:
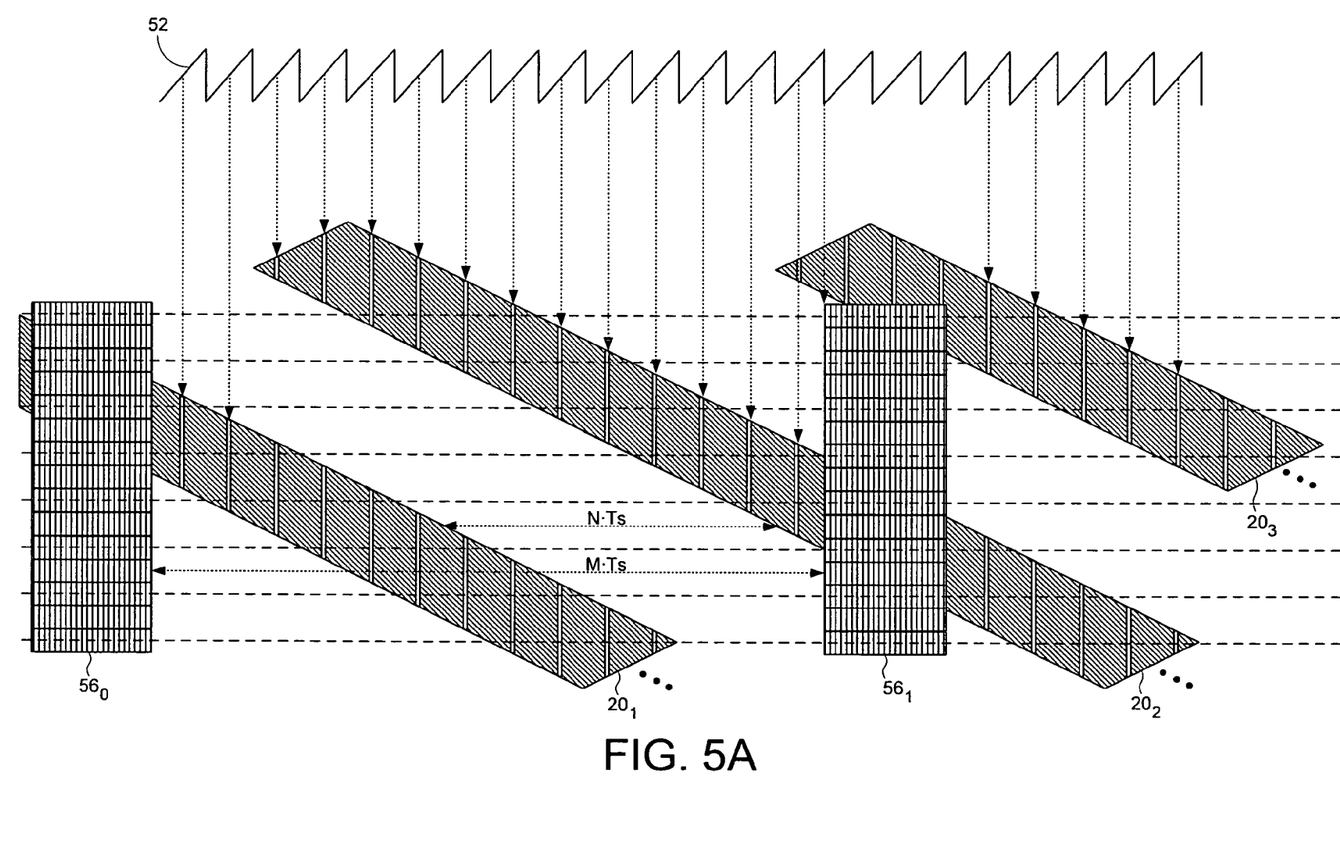
FIG. 5A illustrates writing of product servo sectors using a servo write clock generated from reading the spiral tracks, wherein the number of spiral tracks is greater than the number of servo wedges.

FIG. 4B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N counter values, the servo write clock is coarsely locked to the desired frequency for writing the product servo sectors to the disk 18.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

FIG. 5A illustrates how the product servo sectors in the product servo wedges $56_0$-$56_N$ are written to the disk 18 after synchronizing the servo write clock in response to the high frequency signal 22 and the sync marks 24 in the spiral tracks $20_0$-$20_N$. In the embodiment of FIG. 5A, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5A, the data tracks are narrower than the spiral tracks 20, however, in an alternative embodiment the data tracks are wider than or proximate the width of the spiral tracks 20. Once the head 28 is tracking on a servo track, the product servo sectors in the product servo wedges $56_0$-$56_N$ are written to the disk using the servo write clock. Write circuitry is enabled when the modulo-N counter reaches a predetermined value, wherein the servo write clock clocks the write circuitry to write the product servo sector to the disk.

In the embodiments of the present invention, the number of spiral tracks $20_0$-$20_N$ equals a non-integer multiple of product servo wedges $56_0$-$56_N$. In the example embodiment of FIG. 5A, the number of spiral tracks $20_0$-$20_N$ is less than twice the number of product servo wedges $56_0$-$56_N$. In one embodiment, the spiral tracks $20_0$-$20_N$ are spaced apart by an interval that ensures no part of at least two consecutive spiral tracks $20_0$-$20_N$ is overwritten with the product servo sectors. Referring to the example embodiment of FIG. 5A, when the product servo sectors in servo wedge $56_0$ are written over spiral track $20_1$, the product servo sectors in servo wedge $56_1$ are not written over spiral track $20_2$, and vice versa. In one embodiment, no two consecutive spiral tracks are overwritten around the entire circumference of the disk which ensures that a desired servo sample rate is always maintained when servoing on the spiral tracks. In another embodiment, the spacing between the spiral tracks is selected such that if two consecutive spiral tracks are overwritten, it occurs only a limited number of times around the circumference of the disk to ensure that the desired servo sample rate is interrupted only intermittently.

Figure 5B:
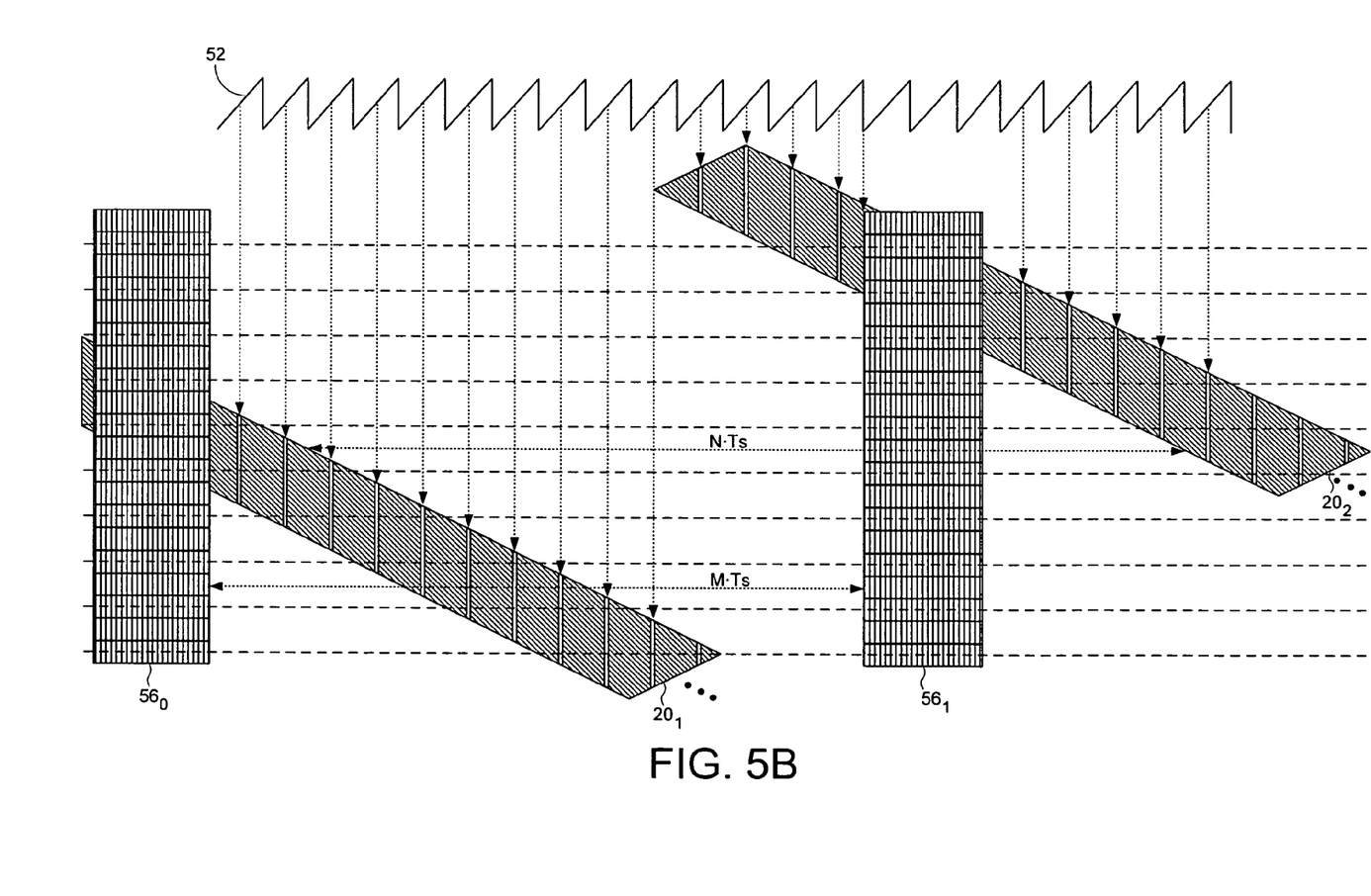
FIG. 5B illustrates writing of product servo sectors using a servo write clock generated from reading the spiral tracks, wherein the number of spiral tracks is less than the number of servo wedges.

In one embodiment, a sample interval Ts is associated with the high frequency signal 22 in the spiral tracks $20_0$-$20_N$ (corresponding to the period of the servo write clock), the spiral tracks $20_0$-$20_N$ are spaced apart circumferentially by N·Ts, where N is an integer, and the product servo wedges $56_0$-$56_N$ are spaced apart circumferentially by M·Ts, where M is an integer. In the embodiment of FIG. 5A, N is less than M resulting in a spacing between the spiral tracks $20_0$-$20_N$ that is less than the spacing between the product servo wedges $56_0$-$56_N$. In another embodiment shown in FIG. 5B, N is greater than M resulting in a spacing between the spiral tracks $20_0$-$20_N$ that is greater than the spacing between the product servo wedges $56_0$-$56_N$ (less spiral tracks $20_0$-$20_N$ are written than product servo wedges $56_0$-$56_N$). Similar to the embodiment of FIG. 5A, in the embodiment of FIG. 5B the spacing between the spiral tracks $20_0$-$20_N$ is selected such that when the product servo sectors in servo wedge $56_0$ are written over spiral track $20_1$, the product servo sectors in servo wedge $56_1$ are not written over spiral track $20_2$, and vice versa. Again, this ensures that no part of at least two consecutive spiral tracks $20_0$-$20_N$ is overwritten with the product servo sectors.

In one embodiment, a circumference of the disk comprises R·Ts sample intervals, R·Ts/N=SN, where SN is an integer representing a total number of spiral tracks, and R·Ts/M=PN, where PN is an integer representing a total number of product servo wedges. In one embodiment, N is selected so that the spiral tracks are spaced apart by an interval that ensures no part of at least two consecutive spiral tracks is overwritten with product servo sectors. In one embodiment, N is the largest integer less than M that ensures no part of at least two consecutive spiral tracks is overwritten with the product servo sectors. In an alternative embodiment, N is the smallest integer greater than M that ensures no part of at least two consecutive spiral tracks is overwritten with the product servo sectors.

Figure 6A:
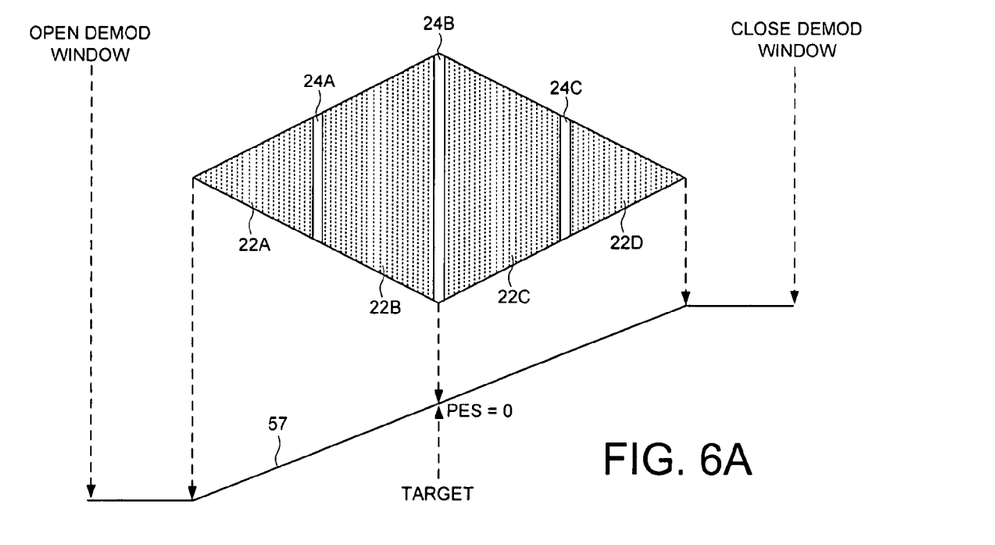
FIG. 6A illustrates an embodiment of the present invention wherein the high frequency signal in the spiral tracks is demodulated by integrating the read signal over a demodulation window and generating the PES relative to a target sync mark and a reference point on the resulting ramp signal.
Figure 6B:
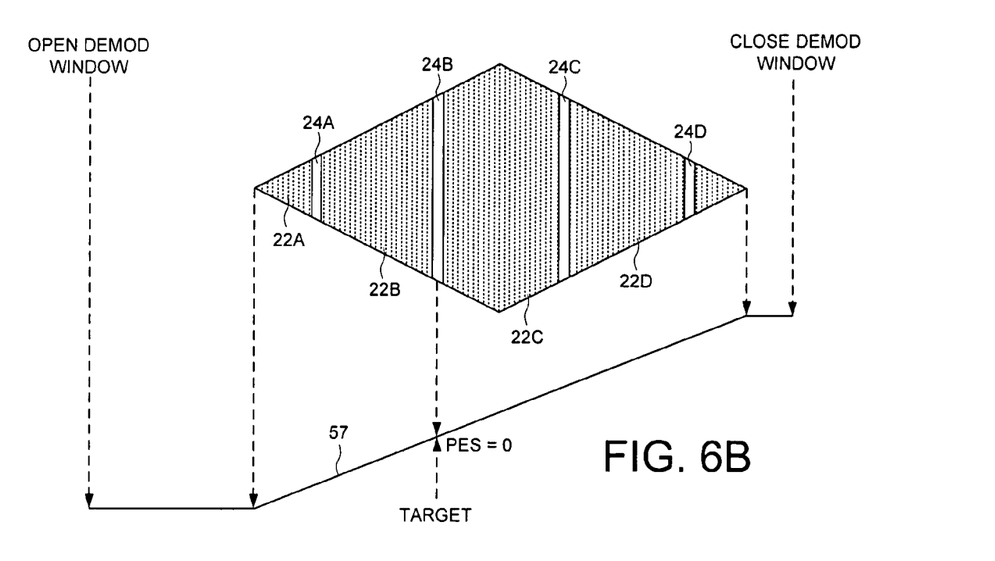
FIG. 6B illustrates initiating a seek operation by adjusting the reference point of the ramp signal.

FIG. 6A shows an embodiment of the present invention wherein the high frequency signal 22 in a spiral track 20 is demodulated by integrating the read signal to generate a ramp signal 57. The PES is generated relative to a target sync mark 24 in the spiral track 20 and a reference point of the ramp signal 57. In the embodiment of FIG. 6A, there are three sync marks 24A-24C in each spiral track crossing (each eye pattern) and the PES is generated as the deviation of the middle sync mark 24B from the center of the ramp signal 57. This deviation can be computed as the difference in the amplitude of the ramp signal 57 when the middle sync mark 24B is detected, or the difference in time between when the middle sync mark 24B is detected and the middle of the ramp signal 57. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 57 is generated by integrating the high frequency signal 22 between the sync marks 24; that is, integration windows within the demodulation window are generated corresponding to the segments of high frequency signal 22 between each sync mark 24 (as determined from servo write clock). FIG. 6B illustrates a seek to a next servo track by adjusting the reference point of the ramp signal 57. Note that the track density can be increased to essentially any resolution by appropriately adjusting the reference point of the ramp signal 57. Note also that the number of sync marks 24 in each spiral track crossing may vary depending on the target radial location of the head (e.g., three sync marks 24 in the spiral track crossing of FIG. 6A and four sync marks 24 in the spiral track crossing of FIG. 6B).

Figure 7:
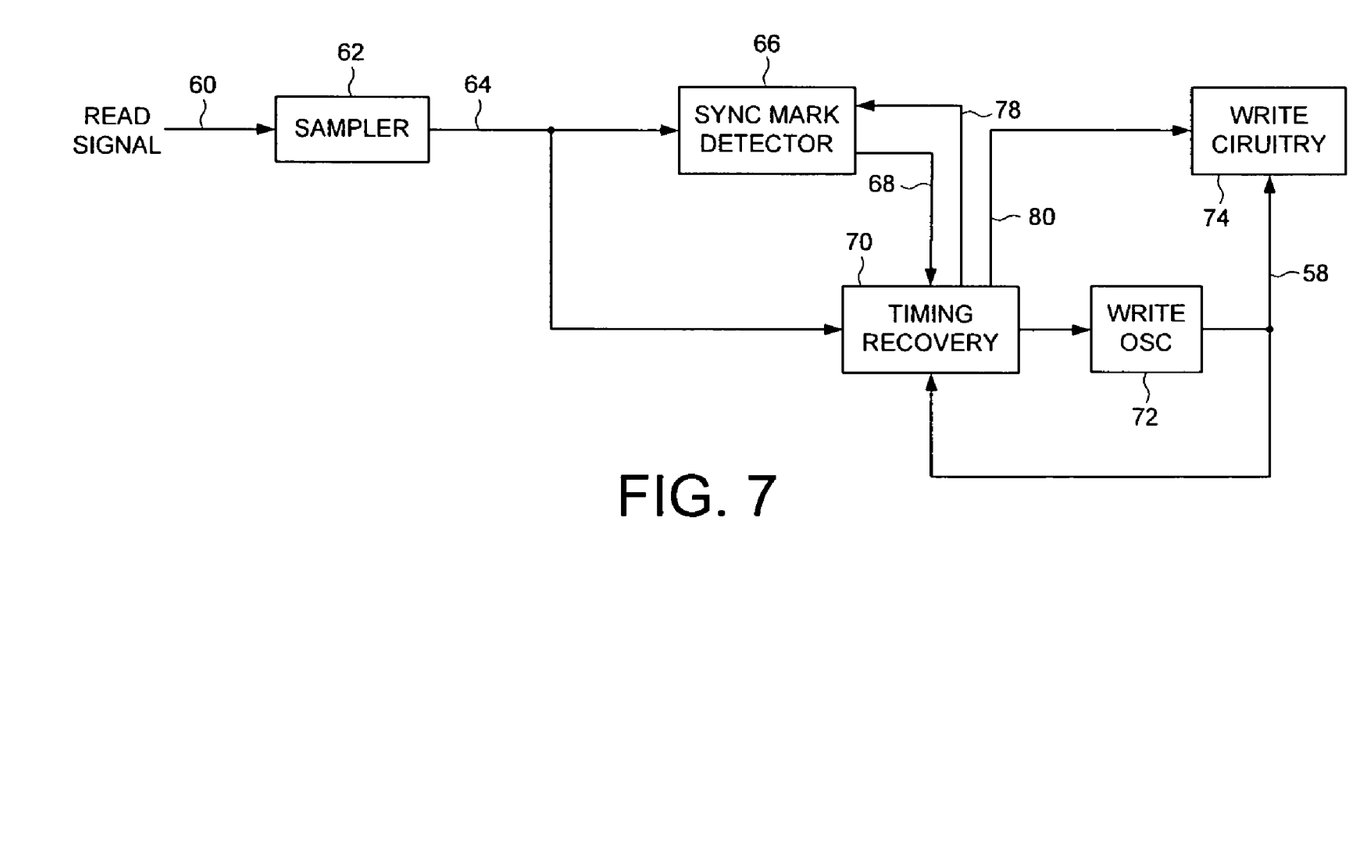
FIG. 7 shows timing circuitry according to an embodiment of the present invention for generating the servo write clock.

FIG. 7 shows details of timing circuitry for synchronizing the servo write clock 58 according to an embodiment of the present invention. The read signal 60 emanating from the head 28 is sampled 62, and the read signal sample values 64 are processed by a sync mark detector 66 for detecting the sync marks 24 in the spiral tracks $20_0$-$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$-$20_N$ to generate a fine timing recovery measurement. The coarse and fine timing recovery measurements are combined to generate a frequency control signal applied to a write oscillator 72 which outputs the servo write clock 58. The servo write clock 58 clocks operation of write circuitry 74 for writing the product servo sectors in the servo wedges $56_0$-$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Figure 8:
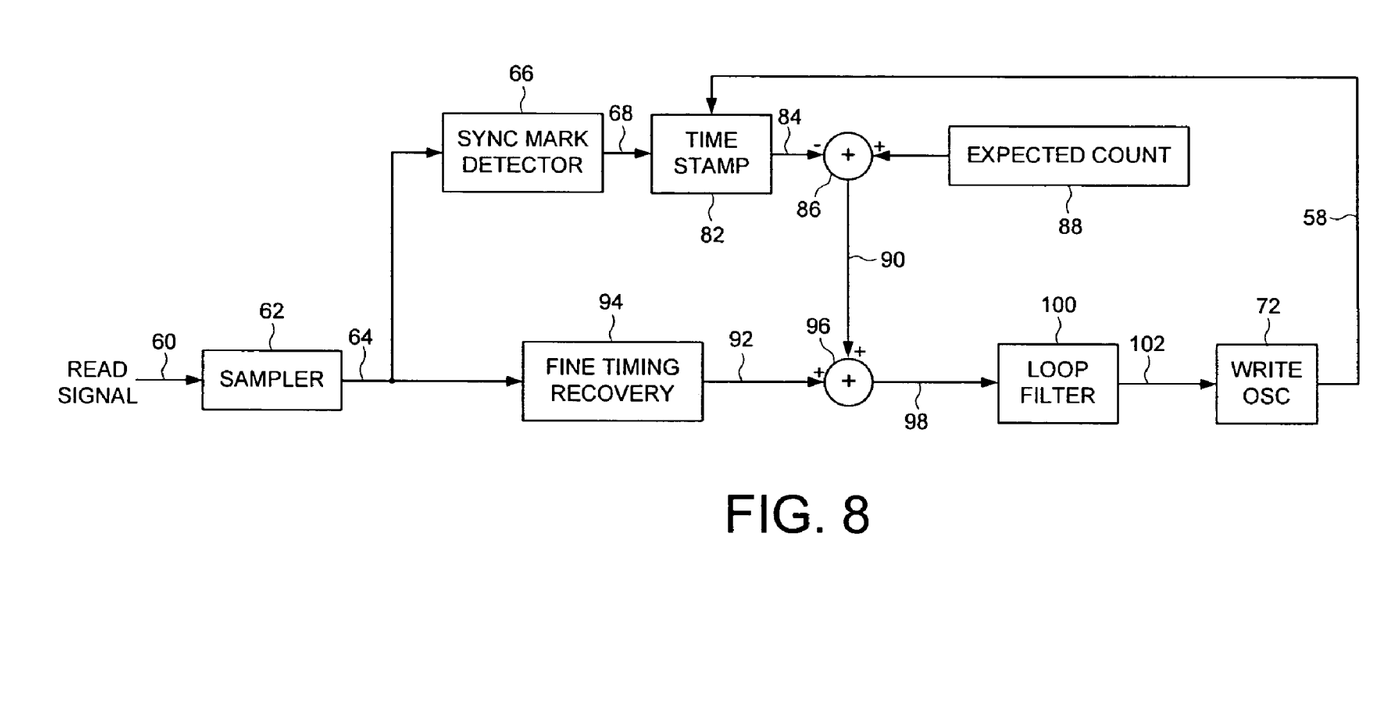
FIG. 8 shows further details of timing circuitry according to an embodiment of the present invention for generating the servo write clock.

FIG. 8 shows further details of timing circuitry for synchronizing the servo write clock 58 according to an embodiment of the present invention. Time-stamp circuitry 82 generates a time-stamped sync mark detect signal 84 representing a time when a sync mark in a spiral track was detected relative to the servo write clock 58. The time-stamp circuitry 82 comprises a modulo-N counter wherein the time-stamp sync mark detect signal 84 is the value of the modulo-N counter when a sync mark is detected. A difference is computed at subtractor 86 between the time-stamped sync mark detect signal 84 and an expected count 88 to thereby generate a coarse timing recovery measurement 90 used to synchronize the servo write clock 58. In one embodiment, the expected count 88 comprises a table of expected module-N count values corresponding to the expected values of the modulo-N counter at each sync mark. Fine timing recovery information 92 is generated by fine timing recovery circuitry 94 which in one embodiment comprises the phase error f between the read signal sample values 64 and expected sample values. The fine timing recovery information 92 is combined at adder 96 with the coarse timing recovery measurement 90 to generate a composite timing recovery measurement 98 filtered by loop filter 100 to generate the control signal 102 for adjusting the frequency of the write oscillator 72.

Figure 9:
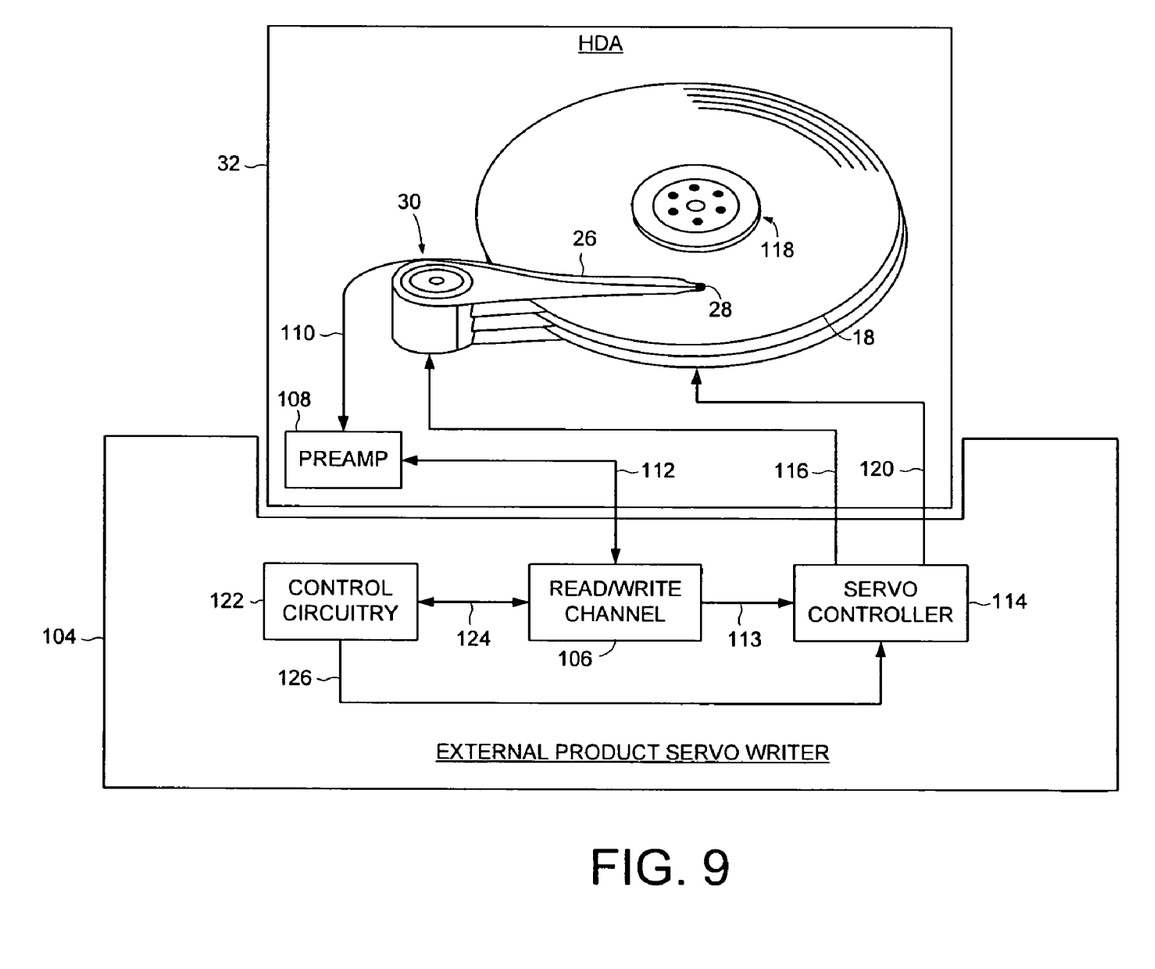
FIG. 9 shows an embodiment of the present invention wherein an external product servo writer is used to process the spiral tracks in order to write the product servo sectors to the disk.
Figure 10:
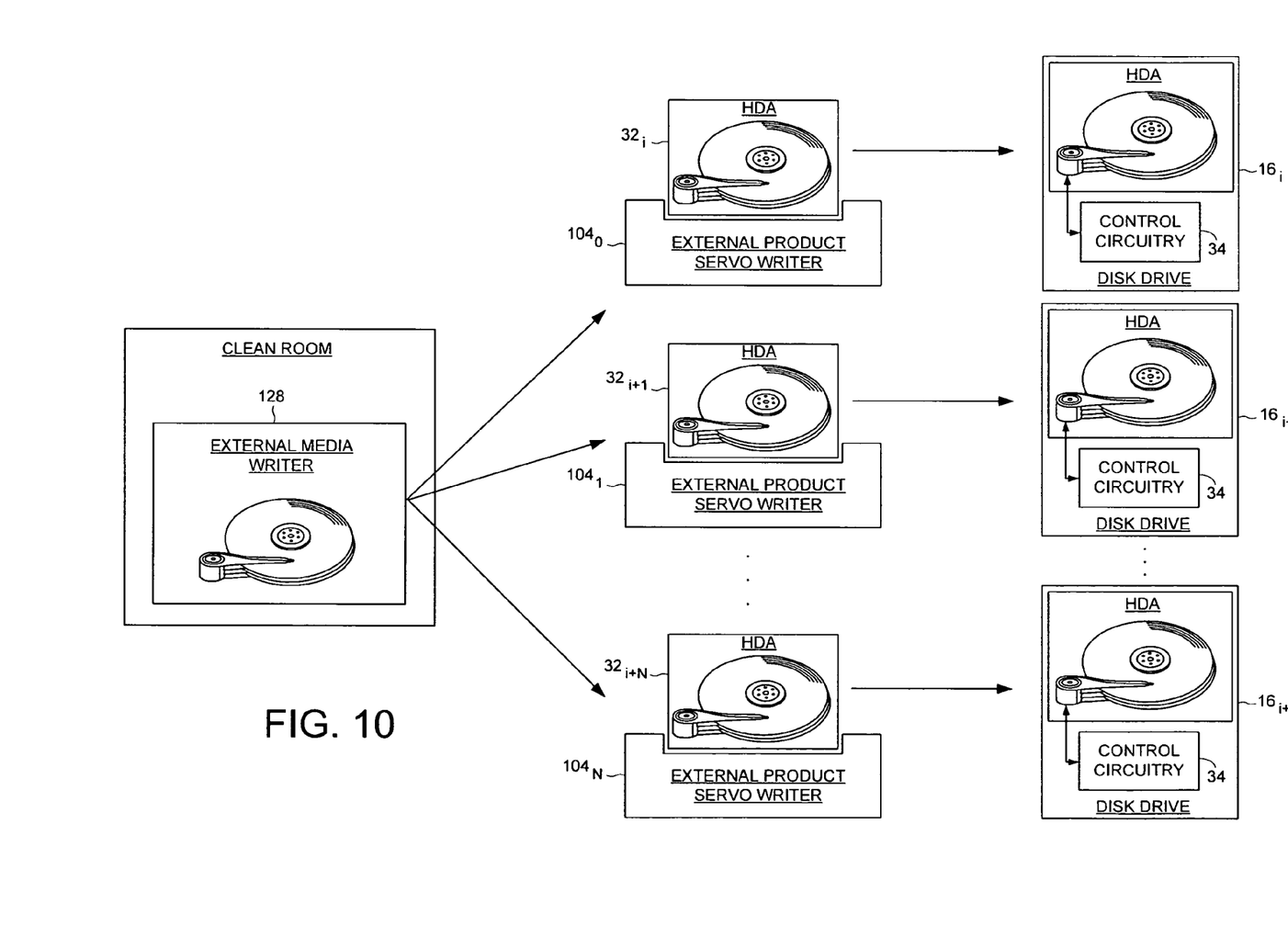
FIG. 10 shows an embodiment of the present invention wherein an external media writer is used to write the spiral tracks, and a plurality of external product servo writers write the product servo sectors.

FIG. 9 shows an embodiment of the present invention wherein after writing the spiral tracks $20_0$-$20_N$ to the disk 18 (FIGS. 2A-2B), the HDA 32 is inserted into an external product servo writer 104 comprising suitable circuitry for reading and processing the spiral tracks $20_0$-$20_N$ in order to write the product servo sectors of the servo wedges $56_0$-$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo information 113 applied to a servo controller 114. The servo controller 114 processes the servo information 113 to generate the PES. The PES is processed to generate a VCM control signal applied to the VCM 30 over line 116 in order to maintain the head 28 along a circular path while writing the product servo sectors in the servo wedges $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors to the disk 18. The control circuitry 122 also transmits control information over line 126 to the servo controller 114 such as the target servo track to be written. After writing the product servo sectors to the disk 18, the HDA 32 is removed from the external product servo writer 104 and a printed circuit board assembly (PCBA) comprising the control circuitry 34 (FIG. 2A) is mounted to the HDA 32.

Figure 11:
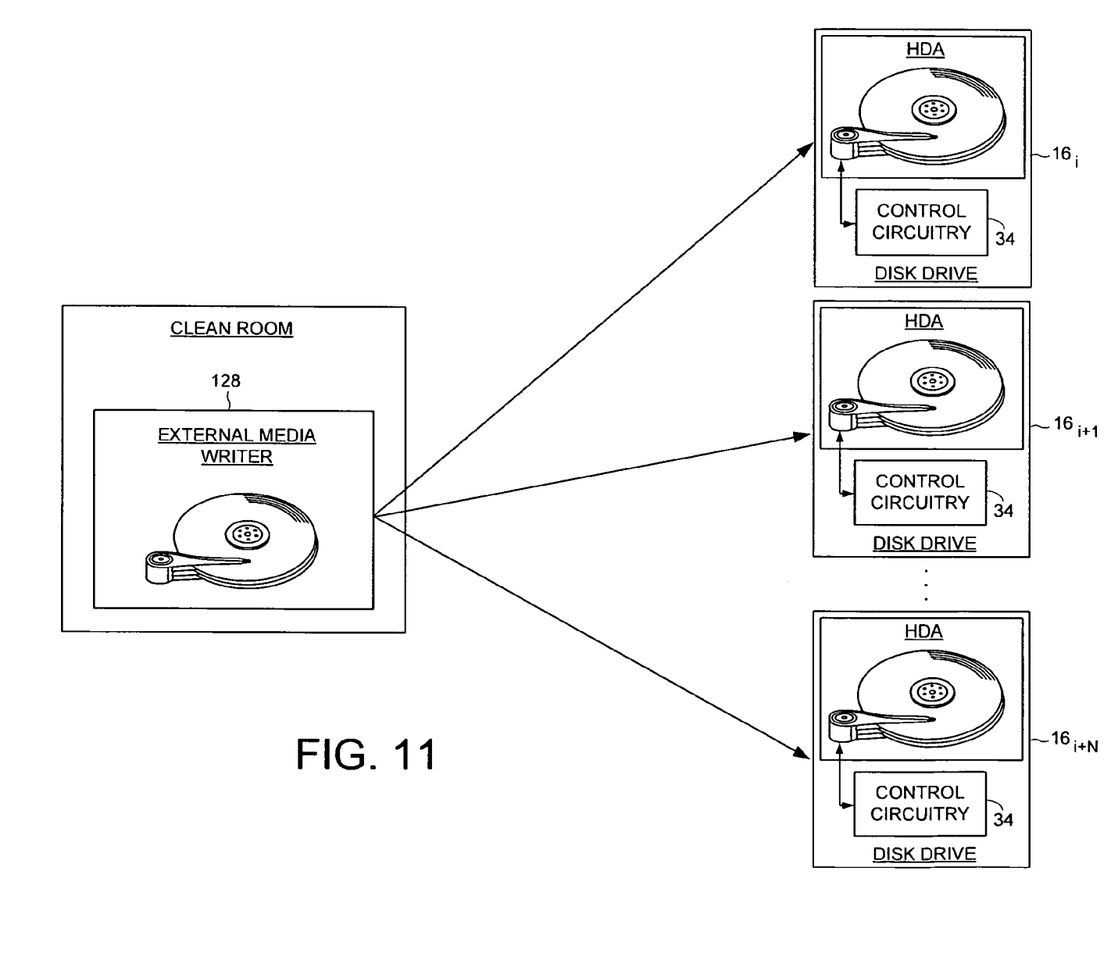
FIG. 11 shows an embodiment of the present invention wherein an external media writer is used to write the spiral tracks, and the control circuitry within each product disk drive is used to write the product servo sectors.

In one embodiment, the external product servo writer 104 of FIG. 9 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 10, an external media writer 128 writes the spiral tracks to the disks which are then inserted into a plurality of HDAs. $32_i$-$32_{i+N}$ and processed by a plurality of external product servo writers $104_0$-$104_N$ in order to write the product servo sectors less expensively and more efficiently than a conventional servo writer. In an alternative embodiment shown in FIG. 11, an external media writer 128 is used to write the spiral tracks, and the control circuitry 34 within each product disk drive $16_i$-$16_{i+N}$ is used to write the product servo sectors.

What is claimed is:

1. A disk drive comprising:
 (a) a disk comprising a plurality of spiral tracks, wherein:
   each spiral track comprises a high frequency signal interrupted periodically by a sync mark;
   the spiral tracks are spaced apart circumferentially by a substantially equal spacing; and the number of spiral tracks equals a non-integer multiple of product servo wedges;
(b) an actuator arm;
(c) a head coupled to a distal end of the actuator arm;
(d) a voice coil motor for rotating the actuator arm about a pivot to position the head radially over the disk; and
(e) control circuitry operable to write product servo sectors on the disk to define the product servo wedges by:
using the head internal to the disk drive to read the spiral tracks to generate a read signal;
detecting the sync marks from the read signal to generate a sync mark detect signal;
generating a timing recovery measurement in response to the sync mark detect signal;
generating a frequency control signal in response to the timing recovery measurement;
generating a servo write clock in response to the frequency control signal; and
using the servo write clock and the head internal to the disk drive to write the product servo sectors to the disk.

2. The disk drive as recited in claim 1, wherein the control circuitry is further operable to:
process the high frequency signal in the spiral tracks to generate a fine timing recovery measurement; and
generate the frequency control signal in response to the fine timing recovery measurement.

3. The disk drive as recited in claim 2, wherein:
a sample interval Ts is associated with the high frequency signal; and
the spiral tracks are spaced apart circumferentially by N·Ts, where N is an integer.

4. The disk drive as recited in claim 3, wherein the product servo wedges are spaced apart circumferentially by M·Ts, where M is an integer.

5. The disk drive as recited in claim 4, wherein N<M.
6. The disk drive as recited in claim 4, wherein N>M.
7. The disk drive as recited in claim 4, wherein:
a circumference of the disk comprises R·Ts sample intervals;
R·Ts/N=SN, where SN is an integer representing a total number of spiral tracks; and
R·Ts/M=PN, where PN is an integer representing a total number of product servo wedges.

8. The disk drive as recited in claim 7, wherein N is selected so that the spiral tracks are spaced apart by an interval that ensures the control circuitry does not overwrite any part of at least two consecutive spiral tracks with product servo sectors.

9. The disk drive as recited in claim 8, wherein N is the largest integer less than M that ensures the control circuitry does not overwrite any part of at least two consecutive spiral tracks with the product servo sectors.

10. The disk drive as recited in claim 8, wherein N is the smallest integer greater than M that ensures the control circuitry does not overwrite any part of at least two consecutive spiral tracks with the product servo sectors.

11. The disk drive as recited in claim 1, wherein the spiral tracks are spaced apart by an interval that ensures the control circuitry does not overwrite any part of at least two consecutive spiral tracks with the product servo sectors.

12. A method of writing product servo sectors to a disk of a disk drive to define a plurality of product servo wedges, the disk comprising a plurality of spiral tracks, wherein:
each spiral track comprises a high frequency signal interrupted periodically by a sync mark;
the spiral tracks are spaced apart circumferentially by a substantially equal spacing; and
the number of spiral tracks equals a non-integer multiple of product servo wedges;
the disk drive further comprises an actuator arm, and a head coupled to a distal end of the actuator arm, the method comprising:
using the head internal to the disk drive to read the spiral tracks to generate a read signal;
detecting the sync marks from the read signal to generate a sync mark detect signal;
generating a timing recovery measurement in response to the sync mark detect signal;
generating a frequency control signal in response to the timing recovery measurement;
generating a servo write clock in response to the frequency control signal; and
using the servo write clock and the head internal to the disk drive to write the product servo sectors to the disk.

13. The method as recited in claim 12, further comprising processing the high frequency signal in the spiral tracks to generate a fine timing recovery measurement, wherein the frequency control signal is generated in response to the fine timing recovery measurement.

14. The method as recited in claim 13, wherein:
a sample interval Ts is associated with the high frequency signal; and
the spiral tracks are spaced apart circumferentially by N·Ts, where N is an integer.

15. The method as recited in claim 14, wherein the product servo wedges are spaced apart circumferentially by M·Ts, where M is an integer.

16. The method as recited in claim 15, wherein N<M.
17. The method as recited in claim 15, wherein N>M.
18. The method as recited in claim 15, wherein:
a circumference of the disk comprises R·Ts sample intervals;
R·Ts/N=SN, where SN is an integer representing a total number of spiral tracks; and
R·Ts/M=PN, where PN is an integer representing a total number of product servo wedges.

19. The method as recited in claim 18, wherein N is selected so that the spiral tracks are spaced apart by an interval that ensures no part of at least two consecutive spiral tracks is overwritten with product servo sectors.

20. The method as recited in claim 19, wherein N is the largest integer less than M that ensures no part of at least two consecutive spiral tracks is overwritten with the product servo sectors.

21. The method as recited in claim 19, wherein N is the smallest integer greater than M that ensures no part of at least two consecutive spiral tracks is overwritten with the product servo sectors.

22. The method as recited in claim 12, wherein the spiral tracks are spaced apart by an interval that ensures no part of at least two consecutive spiral tracks is overwritten with the product servo sectors.

* * * * *